United States Patent [19]

Burkam

[11] 4,373,169
[45] Feb. 8, 1983

[54] MULTI-WINDOW VISUAL DISPLAY SYSTEM FOR FLIGHT SIMULATORS

[75] Inventor: John E. Burkam, Media, Pa.

[73] Assignee: The Boeing Company, Seattle, Wash.

[21] Appl. No.: 89,694

[22] Filed: Oct. 30, 1979

[51] Int. Cl.³ .............................................. H04N 7/18
[52] U.S. Cl. ..................................... 358/104; 358/87; 434/38
[58] Field of Search ................. 358/87, 100, 103, 104; 35/12 L, 12 N, 12 P, 12 W; 434/38, 39, 40, 41, 42, 43, 26, 11

[56] References Cited

U.S. PATENT DOCUMENTS

| | | | |
|---|---|---|---|
| 2,579,177 | 12/1951 | Miles | 434/38 |
| 3,012,337 | 12/1961 | Spencer et al. | 35/12 N |
| 3,052,753 | 9/1962 | Schwarz et al. | 358/104 |
| 3,401,233 | 9/1968 | Hellings | 35/12 N |
| 3,437,748 | 4/1969 | Latady et al. | 358/210 |
| 3,459,465 | 8/1969 | Rosin et al. | 35/12 N |
| 3,582,547 | 6/1971 | Horton et al. | 358/87 |

FOREIGN PATENT DOCUMENTS 1289304  9/1972  United Kingdom ............... 35/12 N Primary Examiner—Joseph A. Orsino, Jr.
Attorney, Agent, or Firm—Felix J. D'Ambrosio; Thomas E. McDonald; Jack D. Puffer

[57] ABSTRACT

A wide-angle image generator of the closed-circuit television type primarily for a helicopter flight simulator, employs four vidicons, each receiving a portion of an image from a single optical system viewing a wall mounted terrain model. The optical system includes an objective lens mounted at the lower end of a yaw tube. The position of the axis of the objective lens relative to the axis of the tube as well as rotation and position of the tube relative to the terrain model are determined by movement of the simulator controls, thus varying the presentation on one display of monitor screens within the view of the pilot at the controls, and another display of monitor screens within the view of an observer. The number of monitors per display is equal to the number of the vidicons.

19 Claims, 5 Drawing Figures

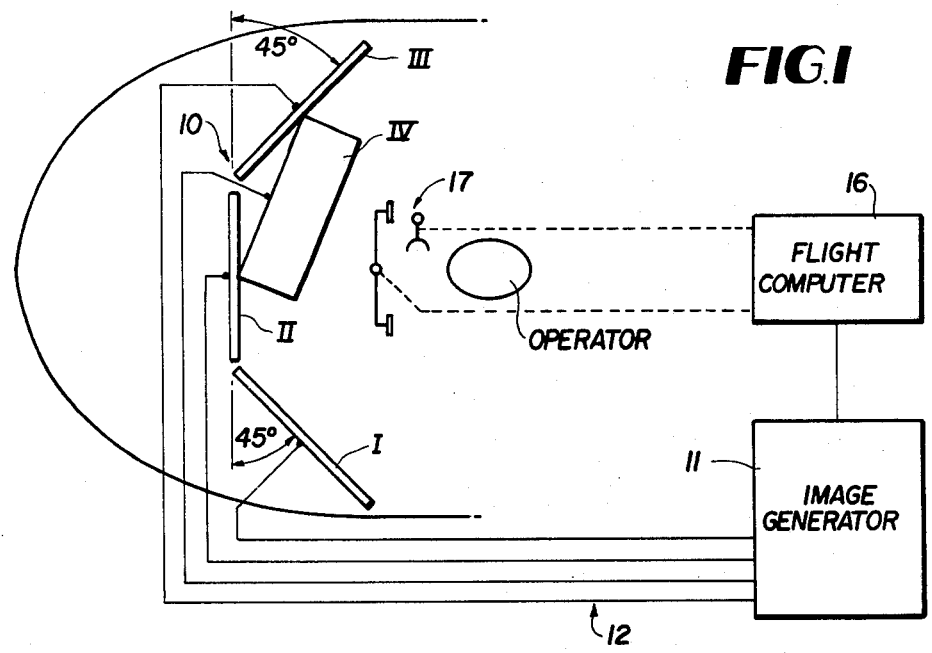
FIG.1
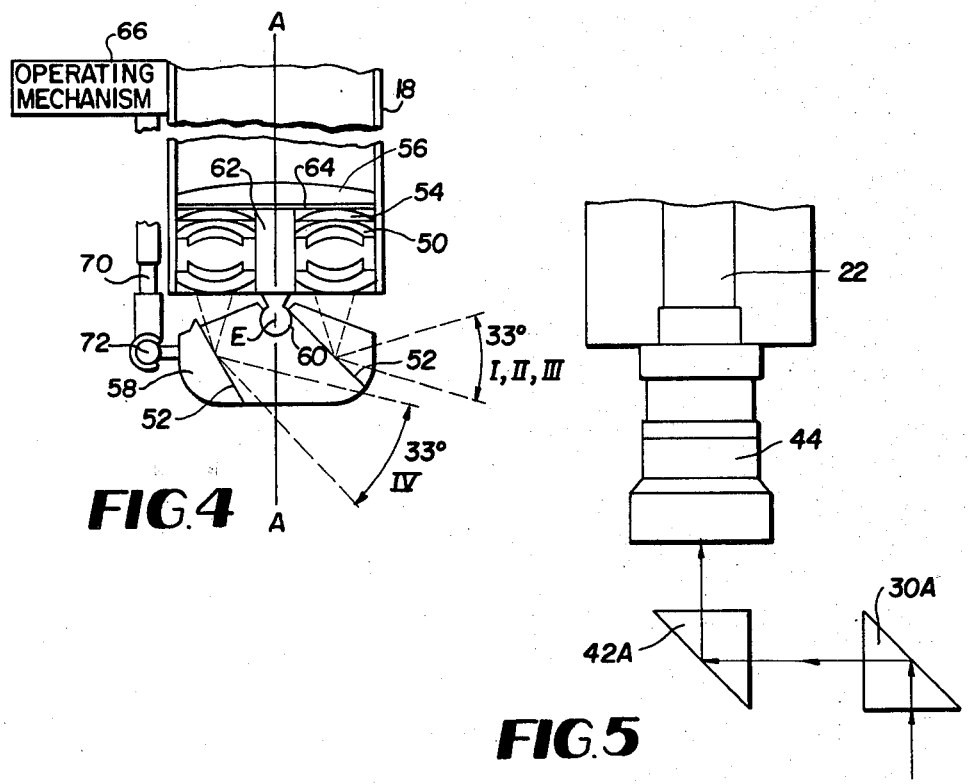
FIG.4
FIG.5

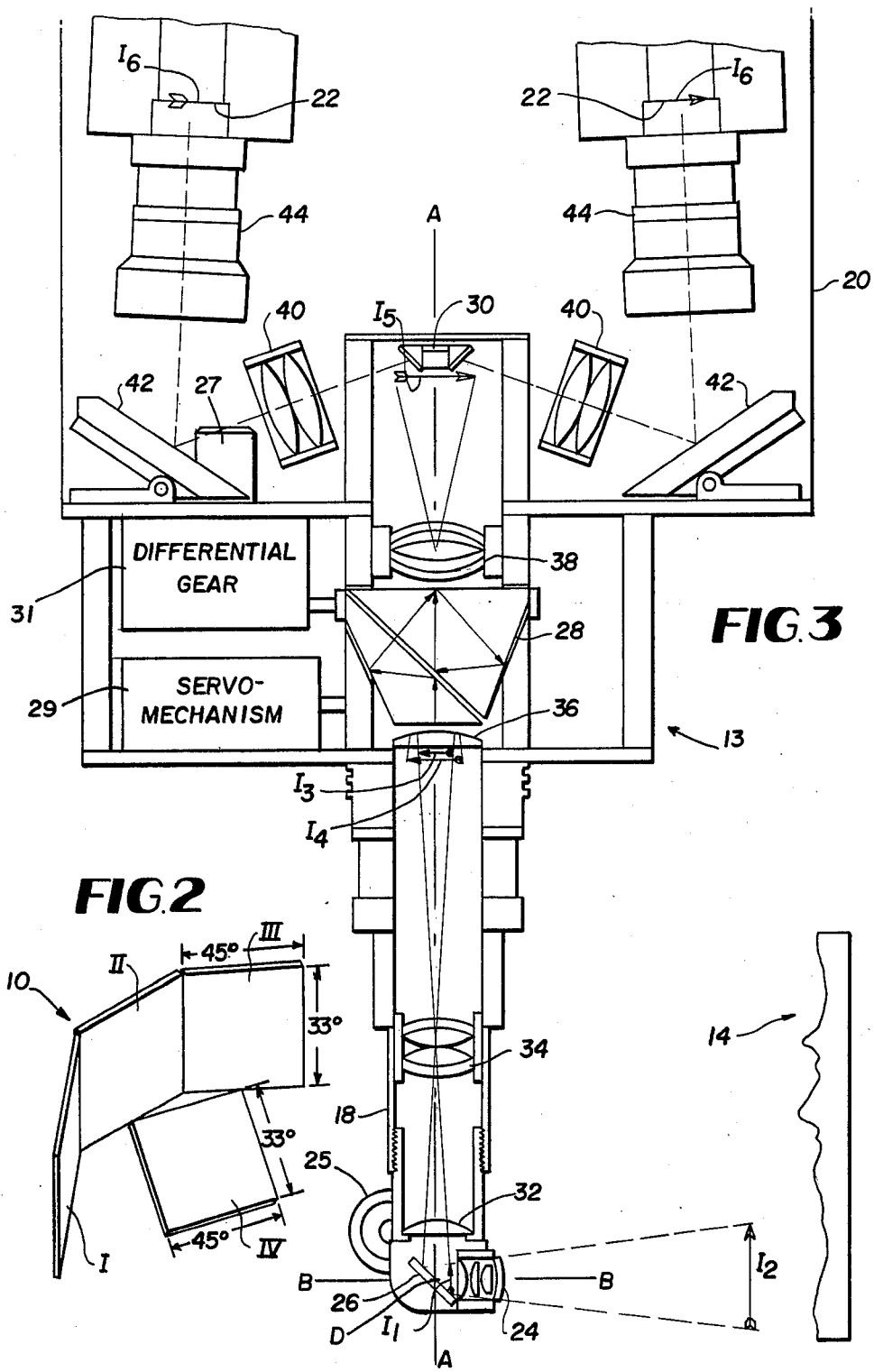

MULTI-WINDOW VISUAL DISPLAY SYSTEM FOR FLIGHT SIMULATORS

BACKGROUND OF THE INVENTION

The invention relates generally to a visual display system for vehicle operation simulators, and in particular to a visual display system for an aircraft flight simulator which provides a wide angle view of a terrain model.

Visual simulation for training aircraft pilots, automobile drivers, radar operators, and the like, is not new and closed-circuit television image generators for this purpose are also known. For a showing in the prior art of closed-circuit television image generators where the source of the image is a terrain model or models which are viewed by one or more television cameras, see U.S. Pat. No. 3,363,332, issued Jan. 16, 1968 to W. D. Akister et al. Such devices are superior to computer generated displays, for example, which require excessive amounts of core memory and lack details and realism. They are also superior to such previously proposed schemes as a point light source projecting a picture on the inside of a large sphere as the latter lacks variety of scenery and also sharpness and contrast. Still another system of the prior art involves projecting motion pictures onto a screen but these systems restrict the possible maneuvers to those of the aircraft which was used to take the pictures in the first place.

In the visual flight simulating system disclosed by U.S. Pat. No. 3,363,332, a wide angle field of vision is provided to the pilot by the use of two separate and complete image generating and projecting systems, both responsive to operation of aircraft controls by the pilot, for producing respective front and side visual displays. Thus, two optic systems and two terrain models simulating the same terrain are required, as well as two television cameras and receivers. Also, both of the terrain models, as well as the television cameras and associated optic systems, are moved to simulate movement of the aircraft.

OBJECTS AND SUMMARY OF THE INVENTION

It is an object of the invention to provide a wide angle image generating system of the closed-circuit television type for an aircraft flight simulator, in which a single terrain model is simultaneously scanned at different angles by a plurality of television cameras, vidicons or the equivalent, to produce on a like plurality of monitor screens within the cockpit of the aircraft flight simulator, a wide angle visual display which is both realistic and infinitely variable.

It is another object of the invention to provide a multiple image generating system, as described above, in which a terrain model is simultaneously scanned by a plurality of television cameras through a single optical system.

It is a further object of the invention to provide a multiple image generating system, as described above, in which motions corresponding to roll, yaw, and pitch movements of the simulated aircraft are generated without movement of the scanning television camera.

The system of the present invention employs a plurality of vidicons which scan a wall-mounted terrain model through a single optical system arranged in a yaw tube, the position of which with respect to the model is under the control of the simulator operator as to heading, yaw, roll, and pitch. This produces a realistic visual display with a very wide field of view not achievable with the devices of the prior art, which can be used as an engineering tool for testing various aircraft control systems and control system gains.

The invention will be better understood, and further objects and advantages thereof will become more apparent from the ensuing detailed description of preferred embodiments taken in conjunction with the drawings.

BRIEF DESCRIPTION OF THE DRAWINGS

FIG. 1 is a diagrammatic illustration of one embodiment of an optical system useful in practice of the present invention;

FIG. 2 is a perspective view of a typical arrangement of television monitor screens;

FIG. 3 is a block diagram showing the overall system;

FIG. 4 shows an alternative objective lens system; and

FIG. 5 shows an alternative embodiment of a portion of the system of FIG. 1.

DESCRIPTION OF THE PREFERRED EMBODIMENTS

Referring to FIG. 1 of the drawings, as is conventional in this art, the image display 10 within the simulator cockpit is fed from the image generator 11 through image transmission means 12. As shown in FIG. 3, the image generator 11 includes a probe 13 and a terrain model 14 which are movable in translation relative to each other. As is well known in this art, movement of the simulator controls 17 to maneuver the aircraft is linked to a computer 16 which calculates or predicts how the aircraft will respond to the controls at each instant and the computer 16 in turn sends appropriate control signals to the image generator 11 to provide a corresponding display on the television monitors within the simulator cockpit. Conventionally such signals include those for generating relative translation movements between the probe 13 and the terrain model 14 in the X, Y and Z directions as well as roll, pitch and yaw movements.

The translation movement of the probe 13 relative to the terrain model 14 may be effected by moving only the probe 13, or by moving only the terrain model 14, or by moving both the probe 13 and the terrain model 14. For example, in the above-referenced U.S. Pat. No. 3,363,332, the terrain model is movable in a Y-direction and a Z-direction. Where a stationary terrain model 14 is used, the probe 13 may be movable in an X-direction along a first path of a gantry trolley carrying the probe, the gantry trolley may be movable in a Y-direction along a second path of the gantry which is orthogonal to the first path, and the gantry may be movable in a Z-direction along a third path of a gantry support structure, which is orthogonal to the first and second paths, to effect translation of the probe 13 relative to the fixed terrain model 14 in any direction.

The image display 10 includes four television monitors I-IV, disposed in wrap-around configuration within the simulator cockpit, as shown in FIGS. 1 and 2. In a typical arrangement in which each monitor covers a 45°×33° field of vision, the television monitors I and III will be disposed at 45° angles to the center television monitor II, with the bottom television monitor IV being tilted upwardly, as shown in FIG. 2.

Turning now to FIG. 3, the probe 13 includes a yaw tube 18 which is rotatably mounted to a support structure or housing 20 for rotation about an optical axis A—A of the yaw tube 18. Four, vidicons 22, two of which are shown in FIG. 3, are mounted within the housing 20. An objective lens system 24, having an optical axis B—B, and a mirror 26 are pivotally mounted at the lowermost end of the yaw tube 18, and the mirror 26 is geared to the objective lens system 24 so that irrespective of the tilt of the optical axis B—B of the objective lens system with respect to the axis A—A of the yaw tube 18, the mirror 26 always reflects the image from the objective system along the axis A—A of the yaw tube 18.

For example, this can be accomplished by pivotally connecting both the objective lens system 24 and the mirror 26 to the yaw tube 18 for rotation about an axis C—C (not shown) which is orthogonal to the axes A—A and B—B and intersects the axes A—A and B—B at a common point D, and gearing the objective lens system 24 to the mirror 26 such that an angular displacement of the mirror 26 in one direction of rotation about the axis C—C will correspond to one-half the same angular displacement of the objective lens system 24 in the same direction of rotation about the axis C—C. This rotation of the mirror 26 during the rotation of the objective lens system 24 so that the mirror 26 always reflects the image from the objective lens system along the optical axis A—A of the yaw tube 18 is well known to the art. For example, U.S. Pat. No. 4,048,863, issued Sept. 13, 1977 to Spooner, discloses a similar arrangement.

Aligned on the axis A—A of the yaw tube 18 adjacent the other end thereof and supported for rotation about the axis A—A independently of the yaw tube 18 is a Pechan prism 28. As is well known in the optical art, a Pechan prism has the property that an image seen therethrough rotates in the same direction but twice as fast as the rotation of the prism. At the upper end of and also on the optical axis A—A of the yaw tube 18 are mirrors 30 diagonally disposed with respect to the axis A—A of the yaw tube 18 and arranged in a pattern corresponding to the arrangement of the TV monitors (I to IV in FIG. 3) in the cockpit of the simulator. Light rays coming up the yaw tube 18 are therefore reflected from the mirrors 30 through an appropriate optical system to the vidicons 22. Each mirror 30 reflects only that portion of the image which is to be seen in that monitor corresponding to the position of that mirror.

In operation, therefore, the probe 13 which consists of the optical system and four vidicons 22 is moved around and controlled by the pilot sitting in the simulator cockpit as he moves the control stick and rudder pedals 17 to maneuver the aircraft or make it fly in any desired direction. The computer 16 calculates or predicts exactly how the aircraft will respond to the controls at each instant and sends appropriate control signals to the probe 13 and to the gantry carrying it. The pitch signal is supplied to a servomotor 25 which tilts the objective lens system 24 together with the mirror 26 up and down. The roll signal is supplied to a servomotor 27 which controls rotation with the Pechan prism 28 about the axis A—A of the yaw tube 18. The yaw signal is supplied to a servo-mechanism 29 which controls rotation of the yaw tube 18 and all of the optical system which is below the Pechan prism 28. Thus, the apparent pitch, roll, and yaw motions are independently controlled by the servomotor 25, the servomotor 27, and the servo-mechanism 29, respectively. However, since an image seen through a Pechan prism rotates in the same direction, but twice as fast as the image supplied to this prism, the Pechan prism motion must be coupled with the yaw tube motion so that the Pechan prism 28 turns opposite to the direction of rotation of the yaw tube 18, and at one-half the speed of rotation of the yaw tube 18, in order to keep the image upright in the television cameras, which do not rotate with the yaw tube 18. This can be accomplished by connecting the servo-mechanism 29, which turns the the yaw tube 18 in accordance with the pilot-operated controls, through a differential gear 31 to the Pechan prism 28 so that this prism 28 turns in a direction opposite to the direction of the rotation of the yaw tube 18 and at one-half of the speed of rotation of the yaw tube 18. Alternatively, this coupling of the Pechan prism motion with the yaw tube motion can be accomplished electrically by using an electrical sensor, rather than the differential gear 31, for sensing the yaw tube motion and transmitting an appropriate signal to the servomotor 27 for the Pechan prism 28. It will be apparent therefore that unlimited roll and yaw motions are possible with a system in accordance with the present invention. The signals for horizontal and vertical translation control the movement of the gantry in the north-south, east-west, and up and down, that is away from and toward, the wall mounted terrain model.

By way of a specific example of the optical system in FIG. 3, light rays from the terrain model 14 are brought to focus in a real image at $I_1$ by the objective lens system 24. This objective may consist of a $13 \times -31$ mm, and an $18 \times 22$ mm plano convex lens. Only the third positive lens is turned convex side forward to reduce the barrel distortion. Shortly after the image $I_1$ is a mirror 26 which as stated above is positioned and geared to the objective lens mount so as to reflect the center of the image up to the exact center of the yaw tube 18 regardless of the angle of inclination of the axis of the objective lens system. The lens 32 at the bottom of the yaw tube has a focal length of 63 mm so as to converge most of the light rays from the image onto a relay lens 34. Field lens 32 produces a virtual image $I_2$ in front of the objective lens. The relay lens 34 with a focal length of 75 mm, perceives the virtual image $I_2$ and forms a real image $I_3$ of the virtual image just in front of the next field lens 36. This field lens has a focal length of 70 mm and forms a virtual image $I_4$ which is seen by a further relay lens 38 having a focal length of 50 mm and which is located just beyond the Pechan prism 28 and forms a real image $I_5$ immediately in front of the four diagonal mirrors 30. Light rays reflected from the mirrors 30 pass through collimating lenses 40 with a focal length of 55 mm and then strike other larger diagonal mirrors 42 where they are reflected toward 75 mm lenses 44 which are screwed into the four vidicons. The focal length and spacing of the lenses 40 and 44 are chosen so as to form the right size image $I_6$ in sharp focus on the vidicons.

It should be noted that the invention is not limited to the arrangement of lenses described above, since different numbers and types of lens, with different spacings, can be used to accomplish the same purpose of transferring the image from the objective lens to the vidicons, which can be more or less than the four vidicons described.

Referring now to FIG. 4, an alternative form of objective lens system is shown. In this embodiment there is a separate lens 50 for each vidicon 22 in order to eliminate most of the distortion which is inevitable in a single extremely wide angle lens as described with reference to FIG. 1. The four objective lenses 50 are arranged in the same plane in a diamond pattern at the bottom end of the yaw tube 18. Directly beneath each of the objective lenses 50 is a mirror 52 positioned to reflect light up into the lens from that portion of the view covered by that particular lens. Directly above each of the lenses 50 is a field lens 54 which gathers light rays from the objective lens and directs them more nearly parallel to the center line A—A of the yaw tube 18. Above these field lenses 54 is a larger field lens 56 which bends the light rays from all four objectives more toward the center of the next lens which is a relay lens 34 such as shown in FIG. 3. Everything above this point may be the same as was described with reference to FIG. 3.

The roll and pitch controls for the objective lens system of FIG. 4, however, are different from that of the single lens system of FIG. 1. In this embodiment, only the mirror block 58 carrying the four diagonal mirrors 52 below the objective lenses 50 is tilted laterally for roll and longitudinally for pitch. Roll motion is limited to about plus or minus 60 degrees and pitch to about plus 20 and minus 40 degrees. The yaw control is the same as with reference to FIG. 1.

As shown in FIG. 4, the mirror block 58 is connected by a ball and socket type swivel 60 to a center support rod 62 which, in turn, is connected to the yaw tube 18 by a radial plate member 64 which is perforated to allow the transmission of light rays from the four objective lenses 50 through the field lens 54 and 56. The swivel 60 allows the mirror block 58 to be pivoted in any direction about a pivot point E on the center axis A—A of the yaw tube 18. The mirror block 58 may be connected to any suitable operating mechanism for rotation about either of two axes which are orthogonal to one another and to the yaw tube axis, to thus rotate the images supplied to the television cameras about either the roll axis or the pitch axis of the simulated vehicle.

For example, two operating mechanisms 66, one of which is schematically shown in FIG. 4, for producing linear displacements in accordance with respective control signals, may be used to position the mirror block 58 in accordance with pitch or roll signals generated by the computer 16. These operating mechanisms 66 may be similar to the mirror control means described in U.S. Pat. No. 3,437,743, issued Apr. 8, 1969, to Latady et al, which includes a motor-driven threaded shaft and follower assembly for axially positioning a mirror control rod.

The two operating mechanisms 66 are disposed on the yaw tube 18, and are angularly displaced by 90° about the yaw tube axis A—A from each other. The operating mechanisms 66 are connected to the mirror block 58 by respective operating links 70. Each operating link 70 is connected at one end to the mirror block 58 by a ball and socket type swivel 72 and at an opposite end to one of the operating mechanisms 66. Each operating link 70 is positioned along a substantially linear path of travel parallel to the yaw tube axis A—A in accordance with the control signal supplied to the operating mechanism 66 from the computer 16.

The operating mechanism 66 shown in FIG. 4 is connected to receive a pitch signal from the computer 16, to move the mirror block 58 about a first axis extending through the mirror block pivot point E corresponding to the pitch axis of the simulated vehicle. The other operating mechanism 66 (not shown) is connected to receive a roll signal from the computer 16, to move the mirror block 58 about a second axis which extends through the pivot point E orthogonal to the first axis and which corresponds to the roll axis of the simulated vehicle.

FIG. 5 shows an arrangement similar to FIG. 3 but with right angle prisms 30A and 42A substituted for the mirrors 30 and 42 of FIG. 3. Such an arrangement provides an increase in the light transmitted thus improving picture quality, contrast and brightness.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. In a vehicle movement simulator which includes a vehicle operator station having vehicle controls, a visual display apparatus for generating a plurality of images to provide an operator with a view of an environment through which his simulated vehicle appears to be moving, said visual display apparatus comprising:

a plurality of television monitors at said station for presenting said plurality of images;

a terrain model;

a probe, carrying a like plurality of television cameras, connected respectively to said television monitors, said probe and said terrain model being movable in translation relative to one another, said probe also carrying optical means for viewing and supplying said images of said terrain model to said television cameras;

computer means, connected to said vehicle controls, for generating position signals proportional to the location of the simulated vehicle relative to the environment through which it appears to be moving, said computer means also generating pitch, roll, and yaw signals proportional to the rotation of the simulated vehicle about pitch, roll, and yaw axes of the vehicle, respectively; and positioning means, connected to receive said position signals generated by said computer means, for moving said probe relative to said terrain model;

said optical means including a tube, having a first end and a second end defining an axis of said tube;

a single wide-angle objective lens means, which is pivotally connected to the second end of said tube and which includes an optical axis intersecting said tube axis, for transmitting a wide-angle image of said terrain model toward said tube axis;

a mirror means pivotally connected to the second end of said tube, for reflecting said wide-angle image along said tube axis toward the first end of said tube;

reflecting means, arranged around said tube axis at the first end of said tube, for reflecting a different portion of said wide-angle image to each television camera;

mirror rotating means, actuated by said wide-angle objective lens means, for rotating said mirror means as said wide-angle objective lens means is rotated so as to reflect the center of the wide-angle image along said tube axis;

yaw means, connected to receive said yaw signal generated by said computer means, for rotating said images of said terrain model about said yaw axis;

roll means, connected to receive said roll signal generated by said computer means, for rotating said images of said terrain model about said roll axis; and pitch means connected to receive said pitch signal generated by said computer means, for rotating said wide-angle objective lens means proportional to the pitch signal, to thus rotate the images of said terrain model about said pitch axis.

2. A visual display apparatus, as described in claim 1, wherein said roll means includes:

a Pechan prism, optically aligned with said tube axis, which is rotatably mounted within said tube intermediate said mirror means and said reflecting means for rotation about said tube axis; and a roll servo means, connected to receive the roll signal generated by said computer means, for rotating said Pechan prism proportional to the roll signal.

3. A visual display apparatus as described in claim 2, wherein said yaw means includes:

said tube, which is rotatably connected to the probe for rotation about said tube axis;

yaw servo means, connected to receive the yaw signal generated by said computer means, for rotating said tube proportional to said yaw signal and coupling means, actuated by rotation of said tube, for rotating said Pechan prism in a direction opposite to the direction of rotation of said tube at one-half of the speed of rotation of said tube.

4. A visual display apparatus as described in claim 3, wherein said reflecting means comprises a plurality of mirrors.

5. A visual display apparatus, as described in claim 3, wherein said reflecting means comprises a plurality of right-angle prisms.

6. In a vehicle movement simulator which includes a vehicle operator station having vehicle controls, a visual display apparatus, for generating a plurality of images to provide an operator with a wide-angle view of an environment through which his simulated vehicle appears to be moving, said visual display apparatus comprising:

a plurality of television monitors at said station for presenting said plurality of images;

a terrain model;

a probe, carrying a plurality of television cameras, one for each television monitor, said television cameras being respectively connected to said television monitors, said probe and said terrain model being movable relative to one another, said probe also carrying optical means for viewing and supplying said images of said terrain model to said television cameras;

computer means, connected to said vehicle controls, for generating position signals proportional to the location of the simulated vehicle relative to the environment through which it appears to be moving, said computer means also generating pitch, roll and yaw signals proportional to the rotation of the simulated vehicle about pitch, roll and yaw axes of the vehicle; and positioning means, connected to receive said position signals generated by said computer means, for moving said probe relative to said terrain model;

wherein said optical means comprises:

a tube, having a first end and a second end defining an axis of said tube;

a plurality of objective lens means, one for each television camera, said plurality of objective lens means being disposed at the second end of said tube in a plane orthogonal to said tube axis;

a mirror support block connected to the second end of said tube adjacent said plurality of objective lens means;

a plurality of mirrors, one for each objective lens means, which are disposed on said block to reflect said plurality of images respectively through said plurality of objective lens means toward the first end of said tube;

reflecting means, arranged around said tube axis at the first end of said tube, for reflecting said plurality of images to said plurality of television cameras respectively;

yaw means, connected to receive said yaw signal generated by said computer means, for rotating said images of said terrain model about said yaw axis;

roll means, connected to receive said roll signal generated by said computer means, for rotating said images of said terrain model about said roll axis; and pitch means, connected to receive said pitch signal generated by said computer means, for rotating said images of said terrain about said pitch axis.

7. A visual display apparatus, as described in claim 6, wherein said pitch means comprises:

said mirror support block, which is pivotally connected to said tube for rotation about a pitch axis orthogonal to said tube axis; and pitch servo means, connected to receive the pitch signal generated by said computer means, for rotating said mirror support block about said pitch axis proportional to said pitch signal, to thus rotate the images respectively supplied to the television cameras about the pitch axis of the simulated vehicle.

8. A visual display apparatus, as described in claim 6, wherein said roll means comprises:

said mirror support block, which is pivotally connected to said tube for rotation about a roll axis orthogonal to said tube axis; and roll servo means, connected to receive the roll signal generated by said computer means, for rotating said mirror support block about said roll axis proportional to the pitch signal to thus rotate the images respectively supplied to the television cameras about the roll axis of the simulated vehicle.

9. A visual display apparatus, as described in claim 8, wherein said pitch means comprises:

said mirror support block, which is pivotally connected to said tube for rotation about a pitch axis orthogonal to both said roll axis of said block and said tube axis; and pitch servo means connected to receive the pitch signal generated by said computer means, for rotating said mirror support block about its pitch axis proportional to said pitch signal, to thus rotate the images respectively supplied to the television cameras about the pitch axis of the simulated vehicle, wherein said mirror support block is simultaneously pivotable about both its pitch and roll axes.

10. A visual display apparatus as described in claim 9, wherein said yaw means includes:
said tube, which is rotatably connected to the probe for rotation about said tube axis; and
yaw servo means, connected to receive the yaw signal generated by said computer means, for rotating said tube proportional to said yaw signal.

11. A visual display apparatus, as described in claim 6, wherein said reflecting means comprises a plurality of right-angle prisms.

12. In a vehicle movement simulator which includes a vehicle operator station having vehicle controls, a visual display apparatus for generating a plurality of images to provide an operator with a wide-angle view of an environment through which his simulated vehicle appears to be moving, said visual display apparatus comprising:
a plurality of television monitors at said station for presenting said plurality of images;
a terrain model;
a probe, carrying a plurality of television cameras, one for each television monitor, said television cameras being respectively connected to said television monitors, said probe and said terrain model being movable relative to one another, said probe also carrying optical means for viewing and supplying said images of said terrain model to said television cameras;
computer means, connected to said vehicle controls, for generating position signals proportional to the location of the simulated vehicle relative to the environment through which it appears to be moving, said computer means also generating pitch; roll, and yaw signals proportional to the rotation of the simulated vehicle about pitch, roll, and yaw of the vehicle; and
positioning means, connected to receive said position signals generated by said computer means, for moving said probe relative to said terrain model;
said optical means including
a tube, having a first end and a second end defining an axis of said tube;
a single wide-angle objective lens means which is pivotally conncected to the second end of said tube and which includes an optical axis intersecting said tube axis, for transmitting a wide-angle image of said terrain model toward said tube axis;
a mirror means pivotally connected to the second end of said tube, for reflecting a wide-angle image along said tube axis toward the first end of said tube;
reflecting means, arranged around said tube axis at the first end of said tube, for reflecting a different portion of said wide-angle image to each television camera;
mirror rotating means, actuated by said wide-angle objective lens means, for rotating said mirror means as said wide-angle objective lens means is rotated so as to reflect the center of the wide-angle image along said tube axis; and
pitch servo means, connected to receive the pitch signal generated by said computer means, for rotating said wide-angle objective lens means proportional to the pitch signal, to thus rotate the images supplied to the television cameras about the pitch axis of the simulated vehicle.

13. A visual display apparatus as described in claim 12, wherein said tube is rotatably connected to said probe for rotation about said tube axis, and said optical means further comprises:
yaw servo means, connected to receive the yaw signal generated by the computer means, for rotating said tube proportional to said yaw signal.

14. A visual display apparatus as described in claim 13, wherein said optical means includes:
a Pechan prism, optically aligned with said tube axis, which is rotatably mounted within said tube intermediate said mirror means and said reflecting means for rotation about said tube axis;
roll servo means, connected to receive the roll signal generated by the computer means, for rotating said Pechan prism proportional to the roll signal; and
coupling means, actuated by rotation of said tube, for rotating said Pechan prism in a direction of rotation of said yaw tube at one-half of the speed of rotation of said tube.

15. A visual display apparatus, as described in claim 12, wherein said reflecting means comprises a plurality of right-angle prisms.

16. A visual display apparatus, as described in claim 1 or 12, wherein said wide-angle lens means has a field of view exceeding 90°.

17. In a vehicle movement simulator which includes a vehicle operator station having vehicle controls, a visual display apparatus for generating a plurality of images to provide an operator with a wide-angle view of an environment through which his simulated vehicle appears to be moving, said visual display apparatus comprising:
a plurality of television monitors at said station for presenting said plurality of images;
a terrain model;
a probe, carrying a plurality of television cameras, one for each television monitor, said television cameras being respectively connected to said television monitors, said probe and said terrain model being movable in translation relative to one another, said probe also carrying optical means for viewing and supplying said images of said terrain model to said television cameras;
computer means, connected to said vehicle controls, for generating position signals proportional to the location of the simulated vehicle relative to the environment through which it appears to be moving, said computer means also generating pitch, roll and yaw signals proportional to the rotation of the simulated vehicle about pitch, roll and yaw axes of the vehicle;
positioning means, connected to receive said position signals generated by said computer means, for moving said probe relative to said terrain model;
said optical means including
a tube, having a first end and a second end defining an axis of said tube;
a plurality of objective lens means, one for each television camera, said plurality of objective lens means being disposed at the second end of said tube in a plane orthogonal to said tube axis;
a mirror support block, connected to the second end of said tube adjacent said plurality of objective lens means, said mirror support block being pivotable about a point on said tube axis;
a plurality of mirrors, one for each objective lens means, which are disposed on said block to reflect said plurality of images respectively through said plurality of objective lens means toward the first end of said tube;

reflecting means, arranged around said tube axis at the first end of said tube, for reflecting said plurality of television cameras respectively roll servo means, connected to receive the roll signal generated by said computer means, for rotating said mirror support block about said roll axis proportional to the pitch signal to thus rotate the images respectively supplied to the television cameras about the roll axis of the simulated vehicle; and pitch servo means, connected to receive the pitch signal generated by said computer means, for rotating said mirror support block about a pitch axis orthogonal to said tube axis proportional to said pitch signal, to thus rotate the images respectively supplied to the television camera about the pitch axis of the simulated vehicle wherein said mirror support block is simultaneously pivotable about both its pitch and roll axes.

18. A visual display apparatus as described in claim 17, wherein said tube is rotatably connected to the probe for rotation about the yaw tube axis and said visual display apparatus further comprises:

yaw servo means, connected to receive the yaw signal generated by the computer means, for rotating said tube proportional to said yaw signal.

19. In a vehicle movement simulator which includes a vehicle operator station having vehicle controls, a visual display apparatus for generating a plurality of images to provide an operator with a wide-angle view, along a line of vision of at least 135°, of an environment through which his simulated vehicle appears to be moving, said visual display apparatus comprising:

a plurality of television monitors, disposed in wrap-around configuration at said station, for presenting said plurality of images;

a terrain model;

a probe, carrying a plurality of television cameras, one for each television monitor, said television cameras being respectively connected to said television monitors, said probe and said terrain model being movable relative to one another, said probe also carrying a single optical system for viewing and supplying said images of said terrain model to said television cameras;

computer means, connected to said vehicle controls, for generating position signals proportional to the location of the simulated vehicle relative to the environment through which it appears to be moving, said computer means also generating pitch, roll and yaw signals proportional to the rotation of the simulated vehicle about pitch, roll and yaw axes of the vehicle;

positioning means, connected to receive said position signals generated by said computer means, for moving said probe relative to said terrain model;

said optical system including a tube, having first and second ends defining an axis of said tube;

a single wide-angle objective lens means, carried on said tube and disposed adjacent the second end of said tube, for transmitting a wide-angle image, with a field of view exceeding 135°, of said terrain model toward said tube axis;

a mirror means disposed at the second end of said tube, for reflecting said wide-angle image along said tube axis toward the first end of said tube;

reflecting means, arranged around said tube axis at the first end of said tube, for reflecting a different portion of said wide-angle image to each television camera;

yaw means, connected to receive said yaw signal generated by said computer means, for rotating said images of said terrain model about said yaw axis;

roll means, connected to receive said roll signal generated by said computer means, for rotating said images of said terrain model about said roll axis, and pitch means, connected to receive said pitch signal generated by said computer means, for rotating said images of said terrain model about said pitch axis.

* * * * *